United States Patent
Tevonian et al.

(10) Patent No.: US 10,530,932 B2
(45) Date of Patent: Jan. 7, 2020

(54) SEAMLESS MECHANISM TO CONNECT AN ACTIVE CALL TO ANOTHER DEVICE

(71) Applicant: ALCATEL-LUCENT USA, INC., Murray Hill, NJ (US)

(72) Inventors: Gregory B. Tevonian, North Aurora, IL (US); Jessica C. Thelen, Naperville, IL (US)

(73) Assignee: Nokia of America Corporation, Murray Hill, NJ (US)

( * ) Notice: Subject to any disclaimer, the term of this patent is extended or adjusted under 35 U.S.C. 154(b) by 274 days.

(21) Appl. No.: 14/930,004

(22) Filed: Nov. 2, 2015

(65) Prior Publication Data

US 2017/0126895 A1  May 4, 2017

(51) Int. Cl.
| | |
|---|---|
| H04M 3/54 | (2006.01) |
| H04W 4/16 | (2009.01) |
| H04M 3/58 | (2006.01) |
| H04L 29/06 | (2006.01) |
| H04M 3/56 | (2006.01) |

(52) U.S. Cl.
CPC .......... *H04M 3/54* (2013.01); *H04L 65/1063* (2013.01); *H04L 65/1083* (2013.01); *H04M 3/58* (2013.01); *H04W 4/16* (2013.01); *H04M 3/56* (2013.01); *H04M 2203/5018* (2013.01)

(58) Field of Classification Search
CPC ......... H04W 4/16; H04M 3/54; H04M 3/541; H04M 3/543; H04M 3/56; H04M 3/561; H04M 3/563; H04M 3/58
See application file for complete search history.

(56) References Cited

U.S. PATENT DOCUMENTS

| | | | | |
|---|---|---|---|---|
| 9,426,299 | B2 * | 8/2016 | Evans | H04L 65/1006 |
| 2003/0186676 | A1 * | 10/2003 | Ogman | H04Q 3/005 |
| | | | | 455/403 |
| 2005/0021872 | A1 * | 1/2005 | Poustchi | H04M 7/006 |
| | | | | 709/250 |
| 2006/0018272 | A1 * | 1/2006 | Mutikainen | H04L 29/12009 |
| | | | | 370/328 |
| 2007/0047698 | A1 * | 3/2007 | Kafka | H04M 3/533 |
| | | | | 379/88.22 |

(Continued)

FOREIGN PATENT DOCUMENTS

EP    2704394 A1    3/2014

OTHER PUBLICATIONS

Rosenberg, "An Invite-Initiated Dialog Event Package for the Session Initiation Protocol (SIP)", Network Working Group; Request for Comments: 4235; Nov. 2005.

(Continued)

*Primary Examiner* — Magdi Elhag
(74) *Attorney, Agent, or Firm* — Kramer Amado P.C.

(57) ABSTRACT

Various embodiments relate to a portable user device including: a wireless transceiver; wherein the portable user device is configured to send a request, via the wireless transceiver, to replace a first user communication device in a communication session between the first user communication device and a second user communication device in response to receiving an indication of the communication session; and via the wireless transceiver, establishing a communication connection with the second user communication device in response to receiving, via the wireless transceiver, an agreement to the request.

14 Claims, 8 Drawing Sheets

(56) References Cited

U.S. PATENT DOCUMENTS

| | | | | |
|---|---|---|---|---|
| 2008/0192904 A1* | 8/2008 | Vagelos | ............ | H04M 3/42263 |
| | | | | 379/88.16 |
| 2009/0034516 A1* | 2/2009 | Liu | .................... | H04L 65/1006 |
| | | | | 370/353 |
| 2010/0272250 A1* | 10/2010 | Yap | ........................ | H04M 3/58 |
| | | | | 379/212.01 |
| 2011/0134807 A1* | 6/2011 | Tevonian | ............ | H04L 65/1016 |
| | | | | 370/260 |
| 2011/0194466 A1* | 8/2011 | Kalele | ..................... | H04M 3/56 |
| | | | | 370/261 |
| 2015/0109968 A1* | 4/2015 | Leno | .................. | H04L 12/1818 |
| | | | | 370/261 |
| 2015/0111553 A1 | 4/2015 | Efrati et al. | | |

OTHER PUBLICATIONS

International Preliminary Report on Patentability dated May 8, 2018 in connection with PCT Application No. PCT/US2016/055972.

* cited by examiner

SEAMLESS MECHANISM TO CONNECT AN ACTIVE CALL TO ANOTHER DEVICE

TECHNICAL FIELD

Various embodiments disclosed herein relate generally to telecommunications.

BACKGROUND

Increasingly, telephone calls are being established as voice over IP (VOIP) calls where audio or video signals are digitized, packetized, and sent across a packet switched network, rather than being sent as a raw analog signal across a circuit. As such, end user devices transmit call data to a far end IP address, where the audio or video will be rendered. To facilitate the initial connection between devices, telephony application servers (TAS) are deployed within the network. To establish a new call, an end user device communicates with a TAS according to the session initiation protocol (SIP). The TAS then negotiates the connection and informs the user devices at the far end IP address to which data should be transmitted for the call.

SUMMARY

A brief summary of various embodiments is presented below. Some simplifications and omissions may be made in the following summary, which is intended to highlight and introduce some aspects of the various exemplary embodiments, but not to limit the scope of the invention. Detailed descriptions of at least one embodiment adequate to allow those of ordinary skill in the art to make and use the inventive concepts will follow in later sections.

Various embodiments described herein relate to a portable user device including: a wireless transceiver; wherein the portable user device is configured to send a request, via the wireless transceiver, to replace a first user communication device in a communication session between the first user communication device and a second user communication device in response to receiving an indication of the communication session; and via the wireless transceiver, establishing a communication connection with the second user communication device in response to receiving, via the wireless transceiver, an agreement to the request.

Various embodiments are described including the embodiments described above wherein the wireless transceiver is configured to register, at a server, an availability of the portable user device in response to the portable user device being available for communication sessions; and wherein the receiving indication being responsive to the registering.

Various embodiments including the embodiments described above additionally include displaying information for the communication session on a display device of the portable user device.

Various embodiments are described including the embodiments described above wherein receiving a selection indication for the communication session includes detecting a user input on the display device.

Various embodiments including the embodiments described above additionally include removing the displayed information for the communication session from the display device of the portable user device after the communication connection between the portable user device and the second user device is established.

Various embodiments including the embodiments described above additionally include: receiving an OK message from the server in response to the request; and sending an acknowledge message to the server in response to the OK message.

Various embodiments are described including the embodiments described above wherein establishing the communication connection with the second user communication device in response to receiving, via the wireless transceiver, an agreement to the request, further comprises establishing a communication connection with both the first user device and the second user device.

Various embodiments described herein relate to an application server including: a network interface; a memory device; a processor in communication with the network interface and the memory device, the processor being configured to: facilitate establishment of communications sessions between multiple devices in response to receiving requests for establishment of such communications sessions; and subsequent to establishment of a communication session, facilitate connection of a third device to the communications session in response to receiving a request to connect the third device to the communications session, including: identifying a first device and a second device currently participating in the communications session, determining that the third device is associated with the second device in connection with at least one group of end users, selecting the first device to receive a reinvitation request based on the determination that the second device and the third device are associated with each other, and transmitting the reinvitation request to the first device, wherein the reinvitation request indicates an IP address to which the first device is to begin transmitting session data for receipt by the third device.

Various embodiments including the embodiments described above additionally include sending a session termination message to the second device.

Various embodiments are described including the embodiments described above wherein the request to connect the third device to the existing communication session is received from the third device.

Various embodiments are described including the embodiments described above wherein the request to connect the third device to an existing communication session is an invitation message that carries a public user ID (PUID) of the third device as a target of the invitation, the method further including: determining, based on the invitation message carrying the PUID of the third device, that the invitation is a request to be connected to an existing session instead of a request to establish a new session.

Various embodiments are described including the embodiments described above wherein the second device and third device are associated with each other based on sharing a public user ID (PUID).

Various embodiments including the embodiments described above additionally include prior to receiving the request to connect the third device to the existing communication session, facilitating establishment of the existing communication session between the first device and the second device; and in response to establishment of the existing communication session, transmitting the identifier to the third device.

Various embodiments including the embodiments described above additionally include in response to receiving the request to connect the third device to an existing communication session, establishing a new conference call session, wherein the IP address is an IP address of a device providing the conference call session.

BRIEF DESCRIPTION OF THE DRAWINGS

In order to better understand various example embodiments, reference is made to the accompanying drawings, wherein.

DETAILED DESCRIPTION

One feature that is provided for by the session initiation protocol (SIP) is the ability to transfer active calls to another device. According to this procedure, the communication path with the far party is interrupted while the telephony application server (TAS) performs the transfer. It may take many seconds for the TAS to send a new call request to the new device and to reestablish communication with the far party after the new device answers the call. Additionally, this functionality is only implemented as a "push" function, wherein the device currently involved in the call indicates the device to which the call will be transferred; it is not possible for another device to "pull" the call from another device.

According to the foregoing, it would be desirable to provide a system and method for transferring or otherwise connecting established calls to another device in a manner that does not cause a noticeable interruption in communication.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., or), unless otherwise indicated (e.g., "or else" or "or in the alternative"). Additionally, the various embodiments described herein are not necessarily mutually exclusive and may be combined to produce additional embodiments that incorporate the principles described herein.

It will be appreciated that, while the various examples herein relate to audio communication sessions, the methods and systems may be easily adapted to other types of sessions such as one- or two-way video sessions or other data transfer.

Figure 1:
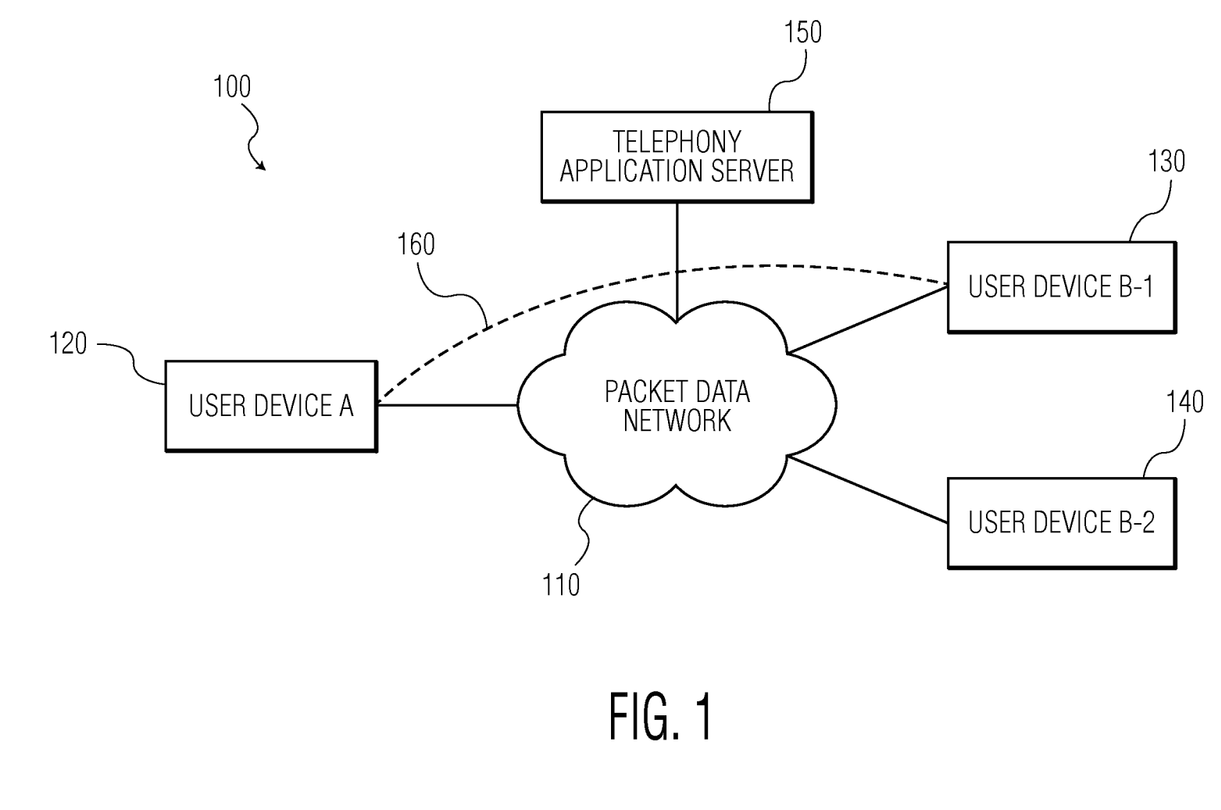
FIG. 1 illustrates an example of an environment for an audio or video communication session.

FIG. 1 illustrates an example of an environment 100 for an audio or video communication session. As shown, a packet data network 110 interconnects multiple user devices 120, 130, 140. The packet data network 110 may be any packet-switched network, or combination of multiple networks, including the Internet. Each user device 120, 130, 140 may be virtually any device capable of communication over the packet data network 110 including, for example, telephones, mobile devices, tablets, personal computers, standalone webcams, video game consoles, television set top boxes, or other devices. In the embodiments described herein related specifically to telephony, the user devices 120, 130, 140 are additionally configured to communicate according to voice over IP (VOIP) protocol. As such, these devices 120, 130, 140 include hardware for enabling audio communication such as cameras, speakers, and microphones. Additionally, these devices are assigned various identifiers including for use in locating the device on the network 110 including, for example, an IP address and a public user ID (PUID).

In some embodiments, multiple devices 130, 140 may be controlled by a single user or otherwise be associated with a "group" of one or more users. As shown, device A 120 is associated with a first user "A," while devices B-1 130 and B-2 140 are associated with a second user "B." For example, user B may have a desk phone 130 and a tablet 140 that are both capable of VOIP communication. In some embodiments, the multiple devices 130, 140 may be associated with the same subscriber account. In some such embodiments, the multiple devices 130, 140 may also be associated with the same public user identity and, therefore, may share a telephone number. In other embodiments, the multiple devices 130, 140 may be associated with subscriber accounts that are otherwise correlated to each other in, for example, one or more telephony application servers (TAS) such as TAS 150.

TAS 150 is a device such as a server computer or blade that facilitates call setup. For example, to establish an audio call 160 between user device A 120 and user device B-1 130, the user device 120 may send a request for call establishment to the TAS 150 which, in turn, would communicate with the user device B-1 130 to determine whether the call is accepted and, if so, inform the two devices 120, 130 of their partner's IP address. Such communications may be performed according to the SIP protocol.

It will be apparent that the environment shown, in some respects, may be a simplification. For example, numerous additional user devices (not shown) and TASs (not shown) may be attached to the packet data network 110. In some embodiments, multiple TASs may be involved in the communication session 160. For example, a first TAS may be associated with user device A 120 while a second TAS may be associated with user devices B-1 130 and B-2 140. In such embodiments, the two TASs may communicate with each other and their respectively associated user devices according to the SIP protocol to effect session establishment and other functions.

According to various embodiments, examples of which will be described in greater detail below, the TAS 150 is additionally capable of facilitating connection of additional devices to the established session 160 in a seamless manner. For example, upon request by either user device operated by user B 130, 140, the TAS 150 may communicate with the user device 120 to transfer the session 160 to user device B-2 140. As another example, upon request by either user device operated by user B 130, 140, the TAS 150 may establish a new conference call and transfer all three user devices 120, 130, 140 to the new conference call (or, in the case where the session 160 is already established as a conference call, add the new device 140 to the call).

Figure 2:
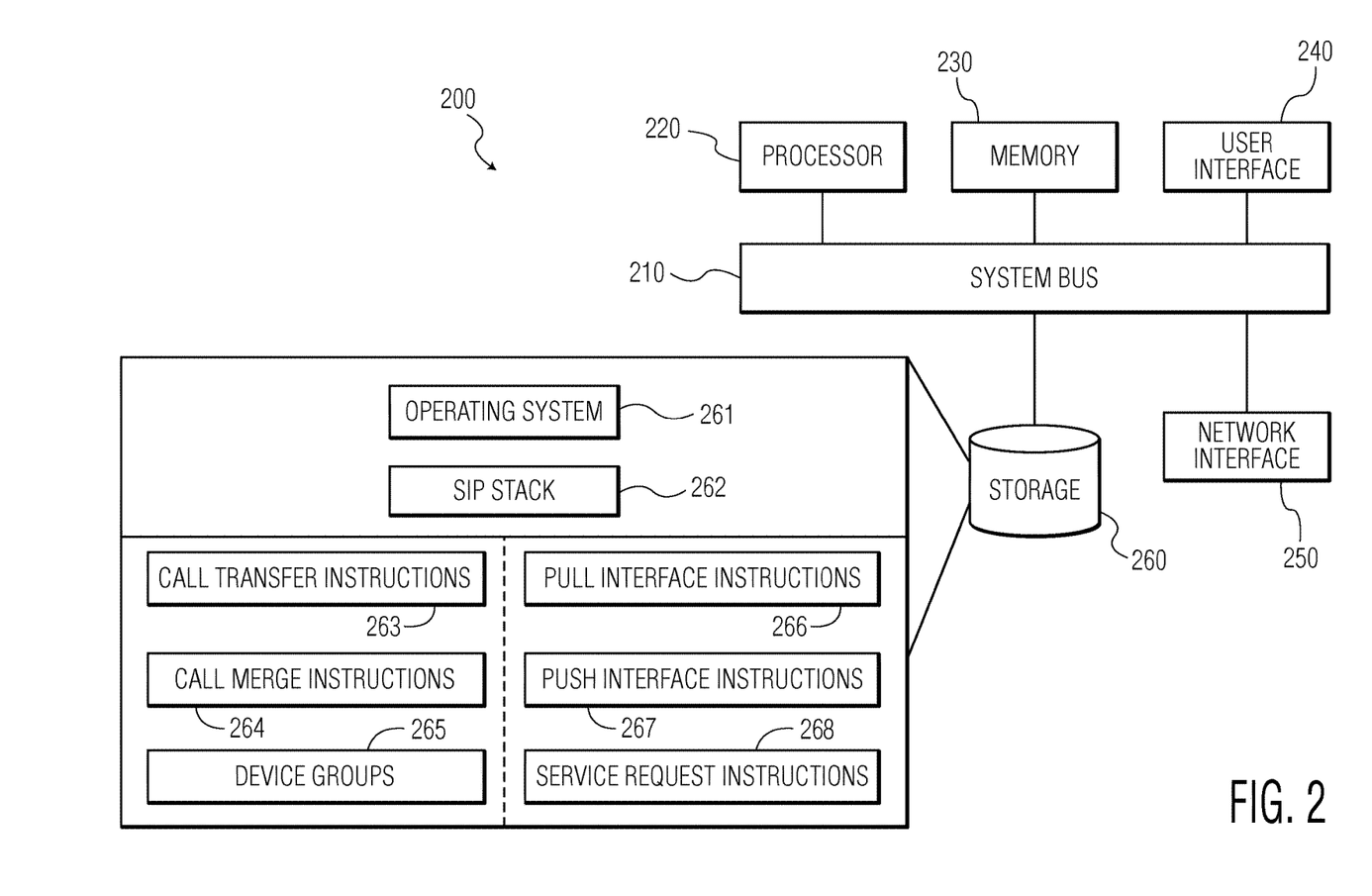
FIG. 2 illustrates an example of a hardware device for implementing an application server or a user device.

FIG. 2 illustrates an example of a hardware device 200 for implementing an application server (such as the TAS 150 of FIG. 1) or a user device (such as one or more of the user devices 120, 130, 140 of FIG. 1). As shown, the device 200 includes a processor 220, memory 230, user interface 240, network interface 250, and storage 260 interconnected via one or more system buses 210. It will be understood that FIG. 2 constitutes, in some respects, an abstraction and that the actual organization of the components of the device 200 may be more complex than illustrated.

The processor 220 may be any hardware device capable of executing instructions stored in memory 230 or storage 260 or otherwise processing data. As such, the processor may include a microprocessor, field programmable gate array (FPGA), application-specific integrated circuit (ASIC), or other similar devices.

The memory 230 may include various memories such as, for example L1, L2, or L3 cache or system memory. As such, the memory 230 may include static random access memory (SRAM), dynamic RAM (DRAM), flash memory, read only memory (ROM), or other similar memory devices.

The user interface 240 may include one or more devices for enabling communication with a user such as an administrator. For example, the user interface 240 may include a display, a mouse, a keyboard, or a touchscreen for receiving user commands. In some embodiments, the user interface 240 may include a command line interface or graphical user interface that may be presented to a remote terminal via the network interface 250.

The network interface 250 may include one or more devices for enabling communication with other hardware devices. For example, the network interface 250 may include a network interface card (NIC) configured to communicate according to the Ethernet protocol. Additionally, the network interface 250 may implement a TCP/IP stack for communication according to the TCP/IP protocols. Various alternative or additional hardware or configurations for the network interface 250 will be apparent.

The storage 260 may include one or more machine-readable storage media such as read-only memory (ROM), random-access memory (RAM), magnetic disk storage media, optical storage media, flash-memory devices, or similar storage media. In various embodiments, the storage 260 may store instructions for execution by the processor 220 or data upon with the processor 220 may operate. For example, the storage 260 may store a base operating system 261 for controlling various basic operations of the hardware 200. Additionally, the storage 262 may include an implementation of the session initiation protocol (SIP) 262 for use in communicating with other devices according to this protocol. The SIP stack 262 may be responsible for forming outgoing messages and for interpreting incoming messages according to SIP. Such functions may be performed as requested by higher level instructions such that these other instructions (e.g., call transfer instructions) need not worry about the specifics of how to communicate according to SIP.

Where the device 200 implements an application server, the storage 260 also includes call establishment instructions 263, call transfer instructions 264, call join instructions 265, and a data structure for maintaining device groups 266. The call establishment instructions 263 may include instructions for interpreting requests for call establishment and for facilitating such call establishment in response. An example of such a method will be described in greater detail below with respect to FIG. 5. The call transfer instructions 264 may include instructions for receiving both push and pull requests for call transfer and then facilitating a seamless handover of an existing session to a new device 264. Examples of call transfer methods will be described in greater detail with respect to FIGS. 6-7. The call join instructions 265 may include instructions for receiving both push and pull requests for adding additional devices to an existing call, establishing a new conference call when appropriate, and facilitating the transfer of one or more devices to the conference call. An example of a call join method will be described in greater detail with respect to FIG. 8. To support these instructions, the storage also includes data representing the device groups 266 such as, for example, records of public user identifiers, records of subscriber accounts and correlated user identities, or correlations between subscriber accounts.

In some embodiments, the application server may also offer a notification subscription feature to user devices whereby user devices are informed of existing calls involving associated devices, thereby facilitating transmission of pull requests. In such embodiments, the storage 260 also includes call notification instructions 267 for recording received subscription requests 268 and for notifying subscribed devices when other, associated devices become party to a communication session. An example of a method for notification subscriptions will be described with respect to FIG. 5.

Where the hardware device 200 implements a user device, the storage 260 may include push interface instructions 273, pull interface instructions 274, and service request instructions 275. The pull interface instructions 273 may include instructions for rendering an interface that displays existing sessions between other devices (e.g., as reported by a notification from an application server) and receiving user selection of such an existing session for call transfer or join. An example of such a pull interface will be described with respect to FIG. 4. In a similar manner, the push interface instructions 274 may include instructions for rendering an interface that displays other devices associated with the present device and receiving user selection of such another device for call transfer or join. In some embodiments, such interface may be integrated into an active call interface. An example of such a push interface will be described in greater detail with respect to FIG. 3. The service request instructions 275 may include instructions for transmitting requests to an application server in response to user selection of a transfer or join via either of the interfaces. For example, the service request instructions may transmit invite or refer SIP messages to the application server, as will be described in greater detail with respect to the examples of FIGS. 6-8. The service request instructions 275 may also include instructions for requesting other services such as, for example, initial call establishment and notification subscription.

It will be apparent that various information described as stored in the storage 260 may be additionally or alternatively stored in the memory 230. In this respect, the memory 230 may also be considered to constitute a "storage device" and the storage 260 may be considered a "memory." Various other arrangements will be apparent. Further, the memory 230 and storage 260 may both be considered to be "non-transitory machine-readable media." As used herein, the term "non-transitory" will be understood to exclude transitory signals but to include all forms of storage, including both volatile and non-volatile memories.

While the host device 200 is shown as including one of each described component, the various components may be duplicated in various embodiments. For example, the processor 220 may include multiple microprocessors that are configured to independently execute the methods described herein or are configured to perform steps or subroutines of the methods described herein such that the multiple processors cooperate to achieve the functionality described herein. Further, where the device 200 is implemented in a cloud computing system (for example, as one or more virtual machines running on server hardware and managed by one or more hypervisors), the various hardware components may belong to separate physical systems. For example, the processor 220 may include a first processor in a first server and a second processor in a second server.

Figure 3:
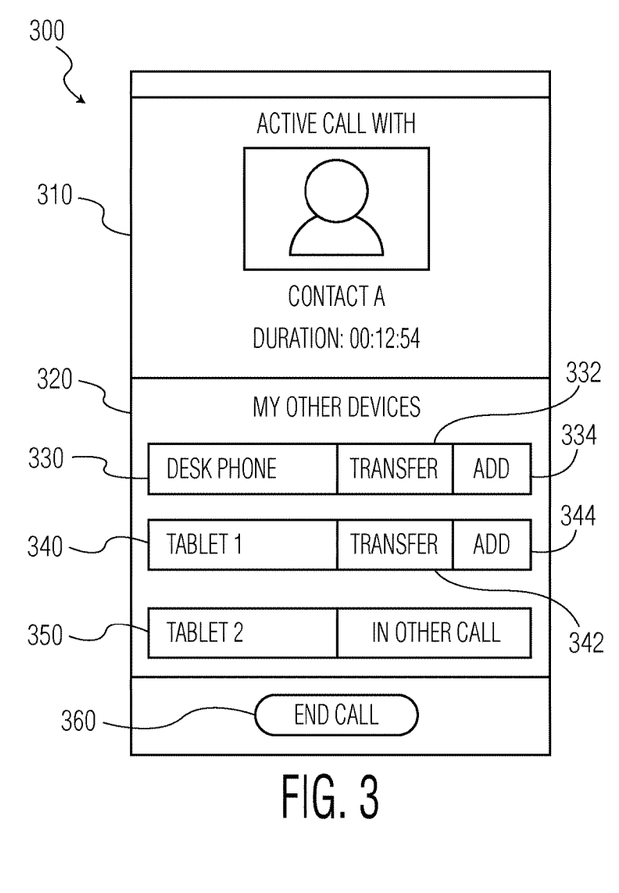
FIG. 3 illustrates an example of a user interface for pushing a call to another device.

FIG. 3 illustrates an example of a user interface 300 for pushing a call to another device. The user interface 300 may be displayed on a user device that is currently participating in an audio or video call session, such as user device B-1 130 of FIG. 1. In various embodiments, the user interface 300 or a portion thereof may be generated and displayed by the push interface instructions 273 of FIG. 2.

As shown, the interface 300 includes a call description area 310 and a push service request area 320. The call description area 310 may convey information relating to an ongoing call in which the device displaying the interface 300 is currently participating. For example, the call description area may identify the name of the far end party, a profile picture of the far end party, and a duration of the call. It will be understood that numerous variations of the call description area may be alternatively implemented.

The push service request area 320 includes a listing of other devices that are associated with the device on which the interface 300 is displayed. For example, the push service request area lists three additional devices: a desk phone 330, a first tablet 340, and a second tablet 350. Such additional devices may be associated by virtue of sharing a public user ID (PUID); for example, when the phone number for the PUID is called, all four devices may ring until one is answered and connected to the session.

Each listed device 330, 340, 350 may be displayed with one or more buttons for a user to indicate a desire to push services to that device. For example, the desk phone entry 330 includes a transfer button 332 for transferring the active call to the user's desk phone and an add button for adding the user's desk phone to the call 334. Similarly, the first tablet entry 340 also includes a transfer button 342 and an add button 344. The second tablet entry 350, on the other hand, indicates that the second tablet is currently in another call and, as such, is not available to receive any pushed services. It will be apparent that various modifications are possible. The user interface also includes an end call button 360 that may be selected to end the current call without performing any transfer function or otherwise connecting another device to the call.

Figure 4:
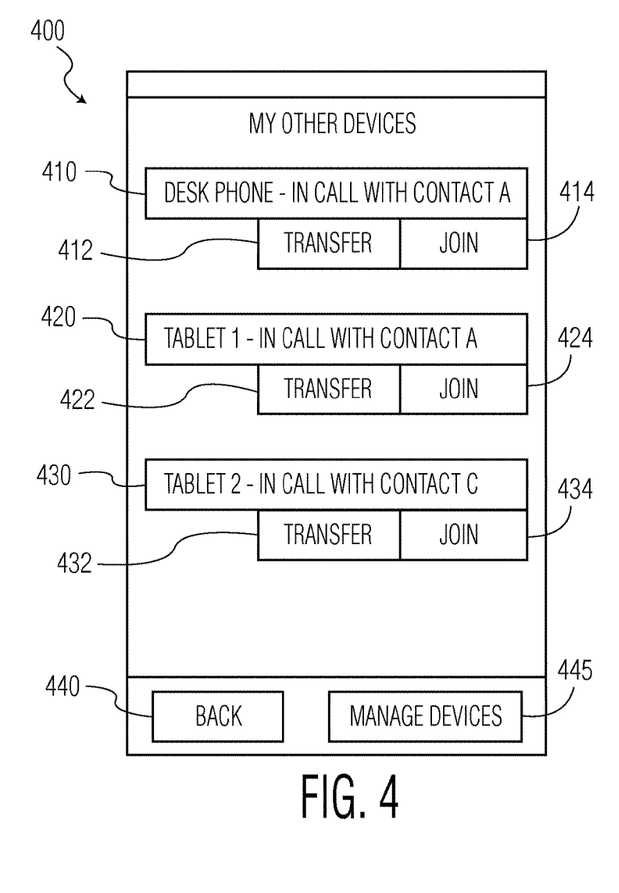
FIG. 4 illustrates an example of a user interface for pulling a call from another device.

FIG. 4 illustrates an example of a user interface 400 for pulling a call from another device. The user interface 400 may be displayed on a user device that is not currently participating in an audio or video call session, such as user device B-2 140 of FIG. 1. In various embodiments, the user interface 400 or a portion thereof may be generated and displayed by the pull interface instructions 274 of FIG. 2. The user interface 400 may be accessed by a user indicating a desire to pull services generally such as, for example, selecting an icon on a home screen of the device or a button on the device associated with pulling services.

As shown, the user interface 400 displays a list of additional devices that are associated with the device on which the user interface is displayed. In some embodiments, the list may include only those devices currently participating in a communications session (e.g., as reported by a TAS) or may include all associated devices along with an indication of the current status (e.g., idle or in a call). As shown, three devices are listed as being in a call. First and second entries 410, 420 indicate that both the desk phone and first tablet are in a (conference) call with "Contact A." The third entry 430 indicates that the second tablet is in a call with "Contact C." Each entry 410, 420, 430 may be associated with one or more buttons for requesting that services be pulled with respect to that device. For example, the desk phone entry 410 includes a transfer button 412 for transferring the call away from the desk phone and to the device on which the user interface 400 is displayed and a join button 414 for joining the present device to the existing call without disconnecting the desk phone. Similarly, the remaining entries 420, 430 are associated with respective transfer buttons 422, 432 and join buttons 424, 434.

The user interface 400 is also shown to include a back button 440 for exiting the pull services interface and a manage devices button 445 for managing the devices that are considered associated with the device on which the interface 300 is displayed. For example, in embodiments where devices may be associated with each other manually, the manage devices button 445 may present an interface (not shown) for adding and deleting devices with which the present device should be considered associated for the purposes of pull and push service requests. Upon changing the associations, the device may transmit an update to the TAS indicating that the associations stored by the TAS should also be updated.

It will be apparent that, while the user interfaces 300, 400 described above are appropriate for touchscreen devices such as tablets and mobile devices, alternative interfaces may be provided for other types of communications devices. Various modifications to provide such alternative interfaces appropriate for other types of hardware to provide the described functionalities will be apparent.

Figure 5:
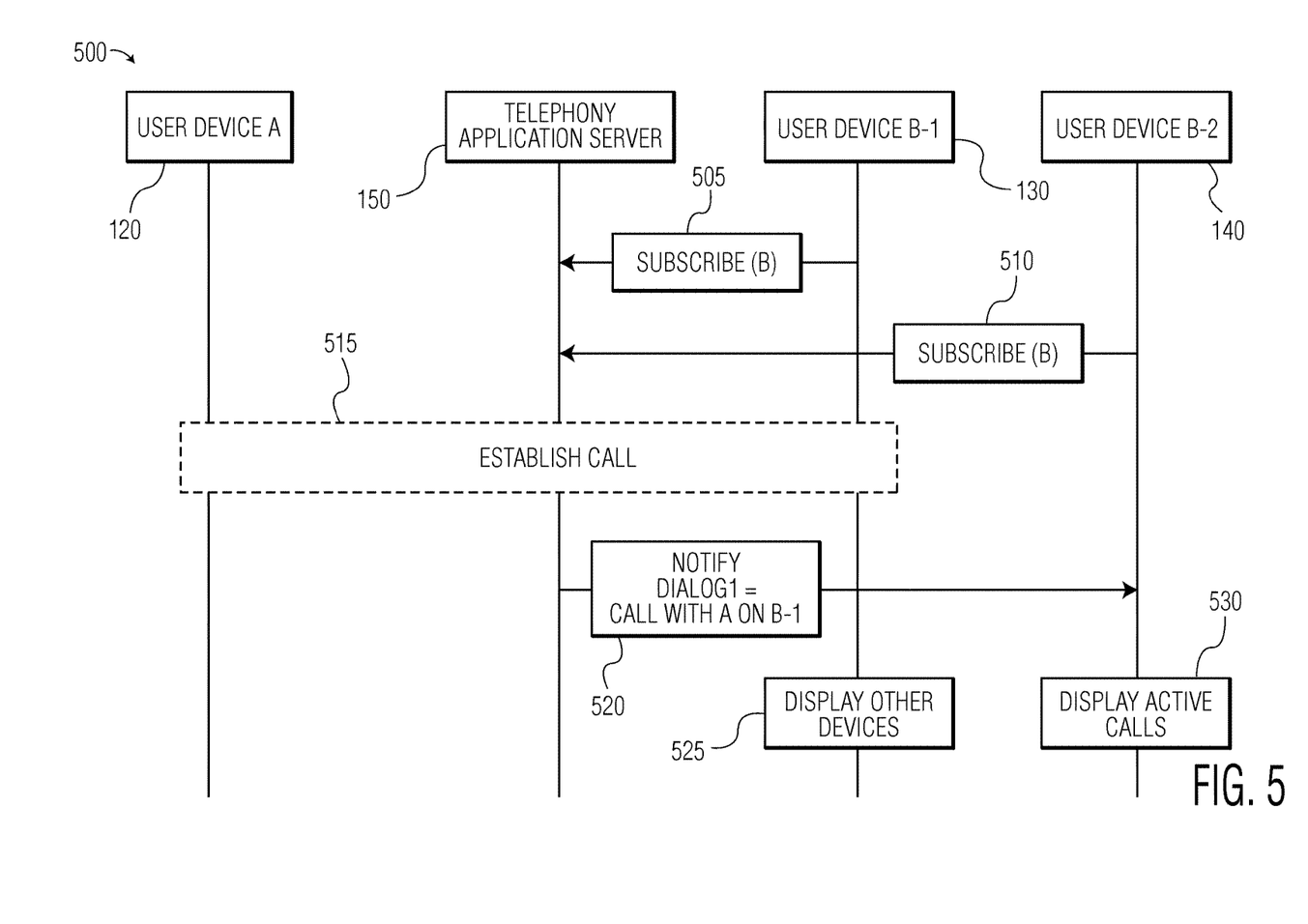
FIG. 5 illustrates an example of a method for establishing a call.

FIG. 5 illustrates an example of a method 500 for establishing a call. As shown. The example method 500 occurs as a sequence of communications between user device A 120, user device B-1 130, user device B-2 140, and TAS 150.

At some point prior to call establishment, the user devices associated with user B 130, 140 transmit subscribe messages 505, 510 to the TAS 150, indicating a desire to receive notifications regarding ongoing call sessions for other devices operated by subscriber B. These messages 505, 510 may be SIP subscribe messages and may specifically identify the account for subscriber B or otherwise identify the group of devices with which the present device will be associated. For example, through the subscribe messages' 505, 510 identification of subscriber B, the TAS 150 may be able to identify the user devices 130, 140 as relevant to the future notifications.

At section 515, a call is established between user device 120 and user device B-1 130. This call establishment may occur according to any known method and may utilize various SIP messages between the user device 120, user device B-1 130, and TAS 150. For example, where the user device A 120 initiates the call, the establishment may begin with the user device A 120 transmitting an audio session description protocol (SDP) offer in a SIP invite message identifying subscriber B to the TAS 150. The TAS 150 may then inform both user device B-1 130 and user device B-2 of the incoming call by transmitting invite SIP messages to each of these devices. Upon a user answering the call on user device B-1 130, the user device B-1 130 may send an OK SIP message back to the TAS 150, which may forward the message on to the user device A 120. Thereafter, the two devices 120, 130 may begin communicating with each other over the now-established call. It will be appreciated that various alternative methods or additional steps may be used for call establishment 515.

Having facilitated establishment of a call with the user device B-1 130, the TAS 150 transmits a NOTIFY message to user device B-2 140 (in accordance with its previous subscription 510) identifying the new session between user device A 120 and user device B-1 130. Thereafter, the user device B-1 130 may display a list of other devices 525 for pushing the call (e.g., by displaying the push user interface 300) while the user device B-2 140 may display a list of active calls 530 for pulling services (e.g., by displaying the pull user interface 400) based on the received notifications.

Figure 6:
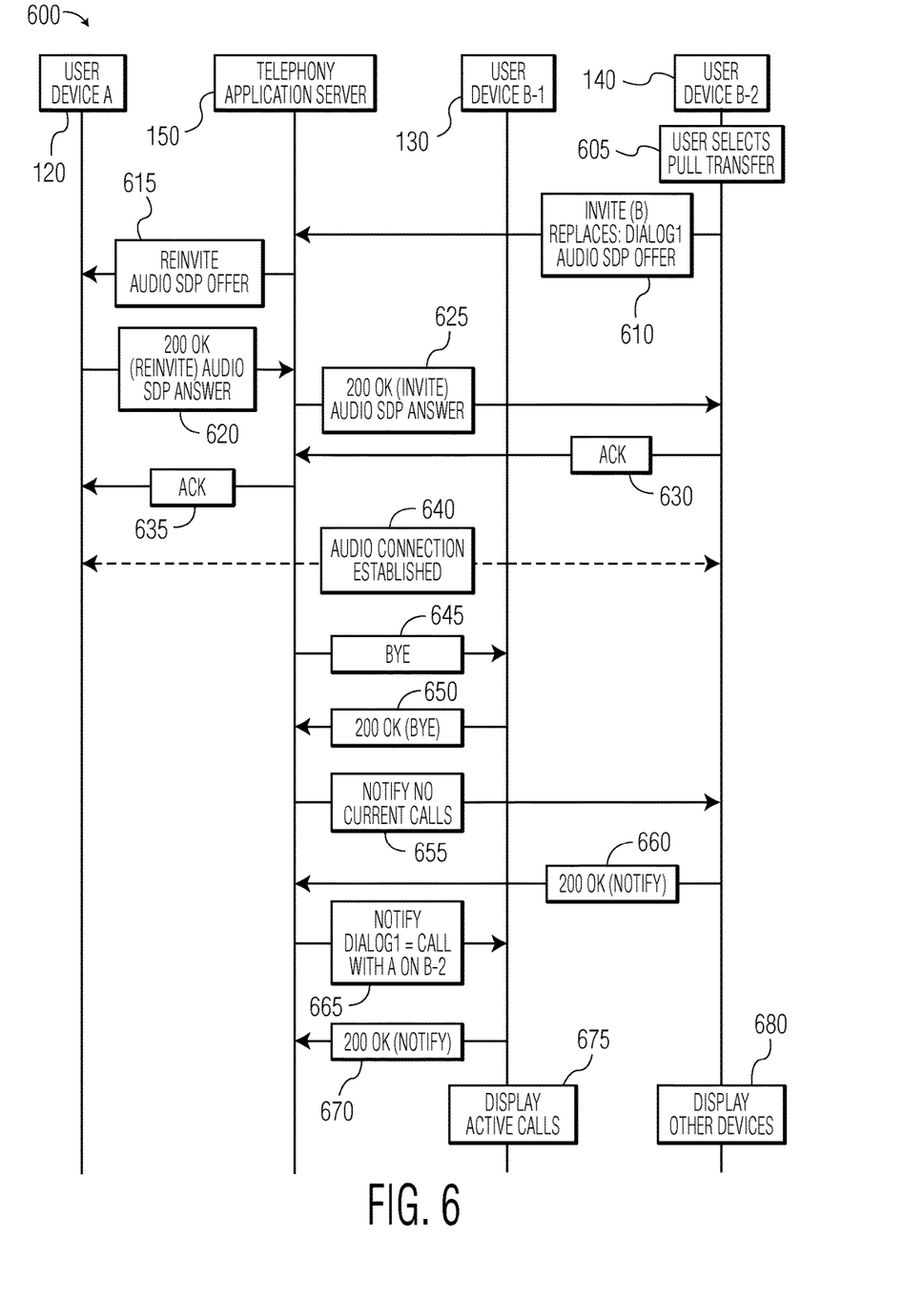
FIG. 6 illustrates an example of a method for pulling a call from another device.

FIG. 6 illustrates an example of a method 600 for pulling a call from another device. As shown. The example method 600 occurs as a sequence of communications between user device A 120, user device B-1 130, user device B-2 140, and TAS 150. In some embodiments, the method 600 may be performed subsequent to call establishment such as, for example, after method 500.

The method begins in step 140 where the user indicates 605 a desire to pull-transfer the call to user device B-2 140. For example, where the user device B-2 140 displays the pull user interface 400, the user may select button 412 if the desk phone corresponds to the user device B-1 130. To initiate the transfer, the user device B-2 140 transmits an INVITE message 610 to the TAS 150. The INVITE message 610 identifies the group of devices associated with subscriber B by, for example, indicating that the invite is targeted to the PUID of the user devices of subscriber B 130, 140. In other words, in this example, the user device B-2 140 transmits an INVITE message 610 targeted to its own PUID. Due to this conflict, the TAS 150 is able to identify the INVITE message 610 as a special case that, rather than requesting establishment of a new call, requests the pull of other services with regard to an ongoing session (e.g., call transfer or join services). The INVITE message 610 is also shown to indicate that the request is to transfer (e.g., using the "Replaces" header) the previously established session between the user device A 120 and user device B-1 130 (e.g., using the identifier "dialog1," previously reported by the TAS 150 in a notification).

To facilitate the call transfer, the TAS 150 then sends a REINVITE message 615 to the user device A 120 indicating that communications should now be directed to the IP address of the user device B-2 140. The user device A 120 then accepts the reinvitation and transmits an OK message 620 back to the TAS 150. The TAS 150 then informs the user device B-2 140 of the IP address of user device A 120 through an OK message 625. After a pair of acknowledgement messages 630, 635, the audio or video connection between the two devices 120, 140 is established 640. The TAS 150 then informs the user device B-1 130 that its participation in the call has ended by transmitting a SIP BYE message 645. The user device B-1 130 then terminates the call locally and transmits an OK message 650 back to the TAS 150 indicating that the user device B 130 has successfully ceased participation in the call.

Having transferred the call away from the user device B-1 130 and to user device B-2 140, the TAS 150 now transmits updated notifications to these device 130, 140 in connection with previously sent subscription messages. First, the TAS 150 notifies 655 user device B-2 140 that no current calls are ongoing (other than the call in which user device B-2 140 is currently participating), which the user device B-2 140 notifies with an OK message 660. Next, the TAS 150 notifies 655 user device B-1 130 of the ongoing communication between user device A 120 and user device B-2 140, which the user device B-1 130 acknowledges with an OK message 670. Thereafter, the user device B-1 130 may display a list of active calls 530 for pulling services (e.g., by displaying the pull user interface 400) based on the received notification 665 while the user device B-2 140 may display a list of other devices 525 for pushing the call (e.g., by displaying the push user interface 300).

Through operation of the above-steps in the example method 600, the system is able to accomplish a seamless handover of a call from user device B-1 130 to user device B-2 140. By simply sending a REINVITE message identifying the new IP address to the user device A 120, there is no need to place the call on hold while the call is transferred to and accepted by the new participant device 140. It will be apparent that similar techniques may be used for push requests and for services other than call transfer.

Figure 7:
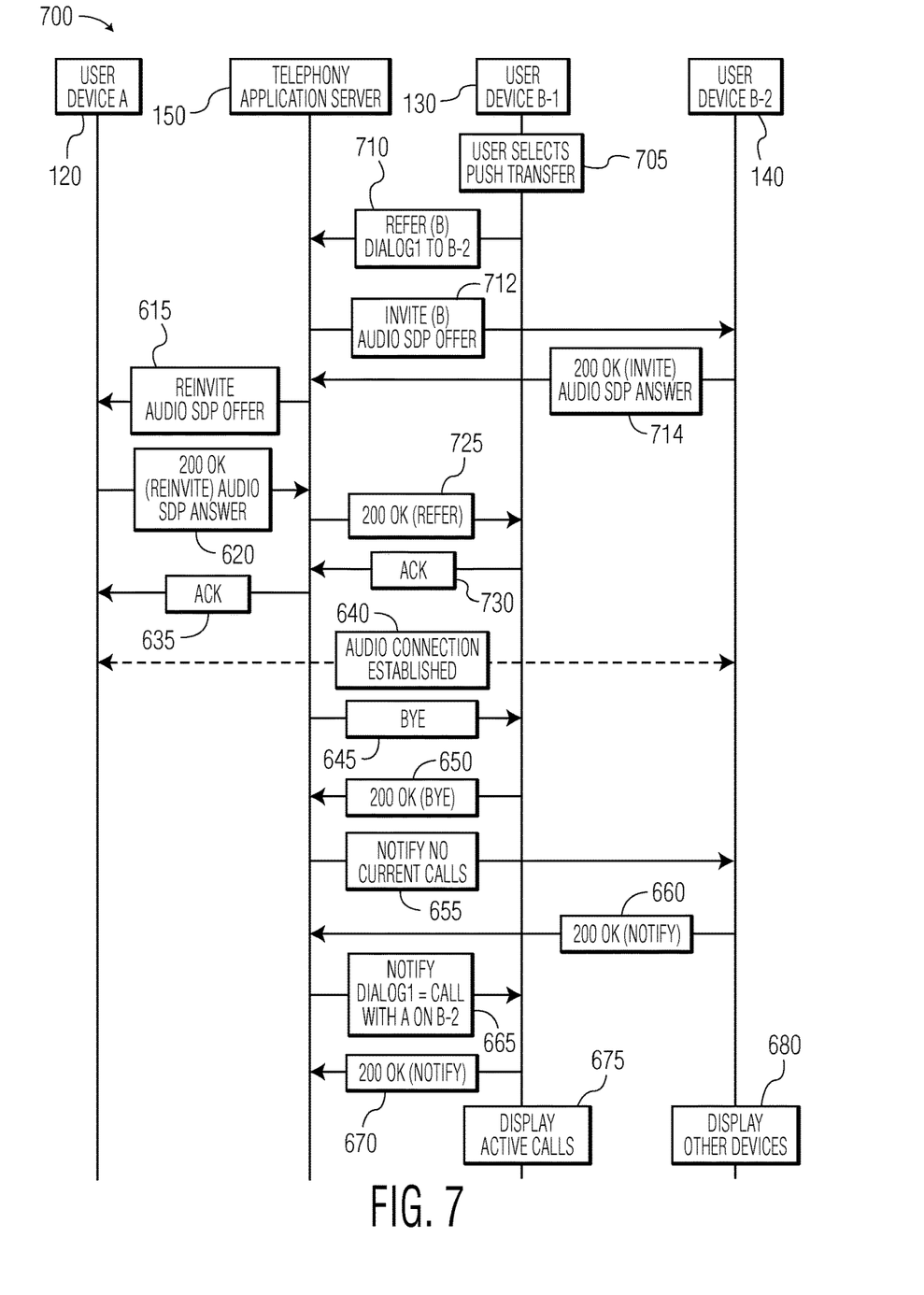
FIG. 7 illustrates an example of a method for pushing a call to another device.

FIG. 7 illustrates an example of a method 700 for pushing a call to another device. The example method 700 occurs as a sequence of communications between user device A 120, user device B-1 130, user device B-2 140, and TAS 150. In some embodiments, the method 700 may be performed subsequent to call establishment such as, for example, after method 500.

The example push transfer method 700 is similar to the example method for a pull transfer 600 and includes multiple steps in common. In the method 700, however, the exchange is initiated instead by a user of the user device B-1 130 which is currently participating in a call with user device A 120 indicating 705 that the call should be transferred to user device B-2 140. For example, if the user device B-1 130 displays the example push user interface 300 and the user device B-2 140 is the user's desk phone, the user may select button 332. In response, the user device sends a SIP REFER message 710 to the TAS 150. Like the SIP INVITE message 610 of method 600, the SIP REFER message 710 is targeted to the PUID of the subscriber B (or otherwise targeted at subscriber B's group of devices). This conflict is recognized by the TAS device 150 as a request to transfer the call according to the methods described herein rather than according to standard methods. As such, rather than immediately sending a REINVITE message to the user device A 120, the TAS 150 first establishes the connection to the user device B-2. The TAS sends an INVITE SIP message 712 to the user device B-2 140, which causes user device B-2 140 to ring. Alternatively, the TAS 150 may send an INVITE message to every device associated with subscriber B, causing all such devices to ring, and connect the call to the device that answers first. After the user device B-2 140 is answered, the user device B-2 140 sends an OK message 714 back to the TAS 150. Having established a connection to the user device B-2 140, the TAS 150 can now seamlessly move the call to the user device B-2 140 using the same REINVITE message 615 described above with respect to method 600. The TAS 150 may also indicate successful call transfer to the pushing device 130 using an OK message 725 which would be acknowledged 730.

Figure 8:
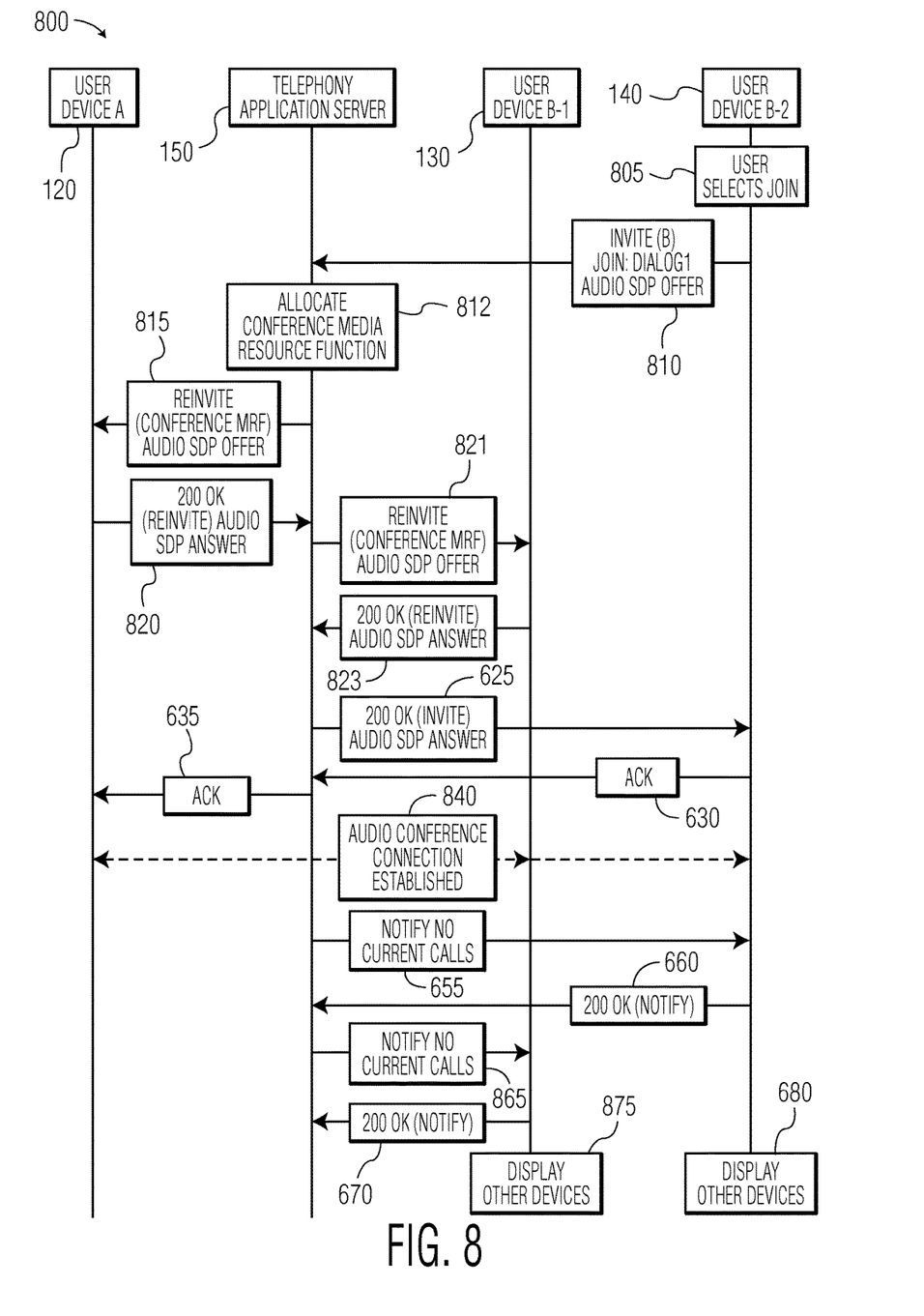
FIG. 8 illustrates an example of a method for joining an active call.

FIG. 8 illustrates an example of a method 800 for joining an active call. The example method 800 occurs as a sequence of communications between user device A 120, user device B-1 130, user device B-2 140, and TAS 150. In some embodiments, the method 800 may be performed subsequent to call establishment such as, for example, after method 500.

The example pull join method 800 is similar to the example method for a pull transfer 600 and includes multiple steps in common. In method 800, however, the exchange is initiated instead by a user of the user device B-2 140, which is not currently participating in the call, indicating 805 that the user device B-2 140 should be added to the call. In response, the user device B-2 140 transmits an INVITE SIP message targeted at the PUID of subscriber B (or otherwise targeted at the devices associated with subscriber B) indicating the desire to join the existing call, "dialog1." The TAS 150 then determines whether the existing call is already a conference call and, if so, can skip to sending the OK message 625. Otherwise, in step 812, the TAS 150 allocates a new conference media resource function (MRF), establishing a new conference call. The TAS then informs the devices currently participating in the call 120, 130 that additional communications should be directed to an IP address of the conference call through two REINVITE SIP messages 815, 821 informing the devices 120, 130 of the new IP address. These devices update their local views of the communications session to point to the conference call IP and send respective OK messages 820, 823 back to the TAS 150. The TAS 150 then informs the user device B-2 140 of the conference call IP in an OK message 625 and the audio conference connection is established 840 between the three devices 120, 130, 140.

After establishment, the TAS 150 sends notifications 655, 865 to the devices 130, 140 that have subscribed to such notifications indicating that there are no current calls other than the conference call in which the two devices 130, 140 are currently participating. These devices 130, 140 then display a list of other devices 875, 680 for pushing the call (e.g., by displaying the push user interface 300).

It will be apparent that, while an example of a push join (or "add") method has not been described in detail, that such a method is easily implemented through a combination of the example push transfer method 700 and pull join method 800. Further, while examples of other services that may be pushed or pulled with respect to an ongoing session, it will be apparent how the methods described herein could be adapted to such alternative services.

Figure 9:
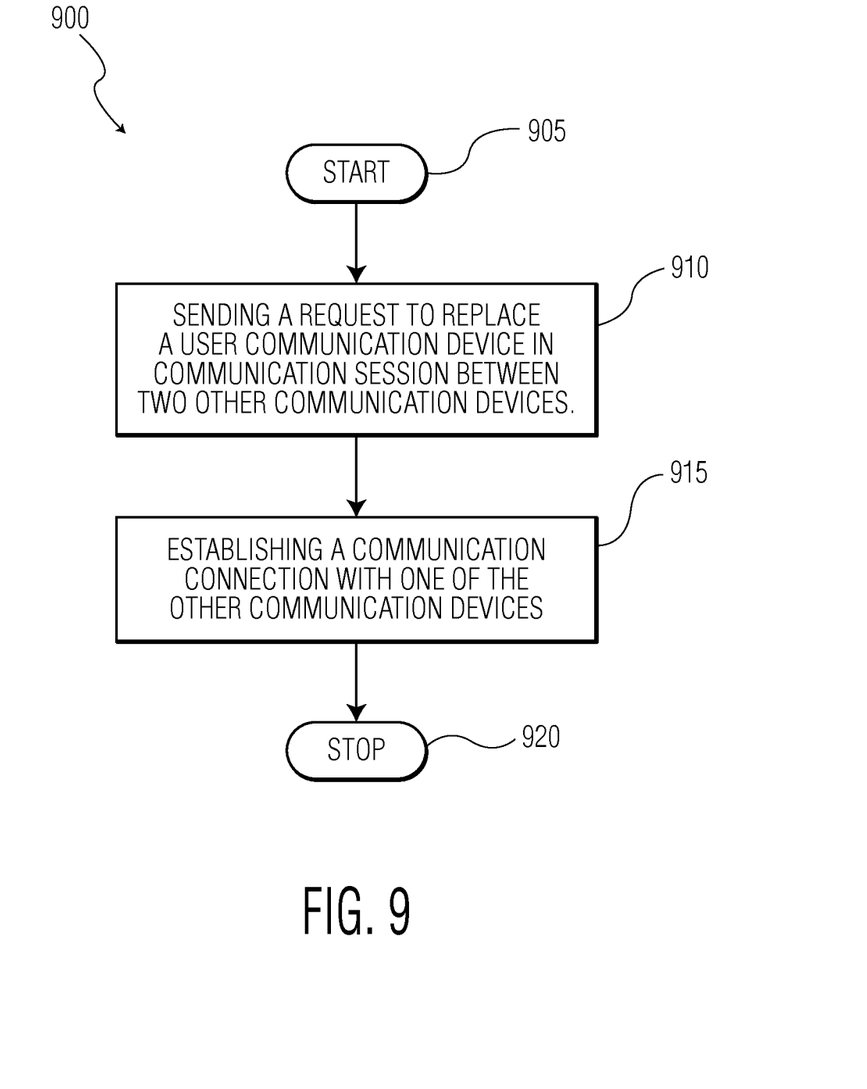
FIG. 9 illustrates a method of how a user device joins an existing call.

FIG. 9 illustrates a method of how a user device joins an existing call. The method 900 begins at 905. The user device, which may be a portable wireless device, may send a request to replace a user communication device in a communication session between two other devices 910. This is also described above. Next, the user device may establish a communication connection with one of the other communication devices 915. The method 900 may then stop at 920.

According to the foregoing, various embodiments enable the seamless provision of services, such as call transfer and call join, with regard to an ongoing communications session. For example, by allowing a device to send a pull request for a call transfer, thereby implicitly opening communications with the new device, or by establishing communication with the new device first, the far end device can be seamlessly switched over to the new device through a single request updating the IP of the device with which the far end device communicates. Various additional benefits will be apparent in view of the foregoing.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A non-transitory machine-readable storage medium may include any mechanism for storing information in a form readable by a machine, such as a personal or laptop computer, a server, or other computing device. Thus, a non-transitory machine-readable storage medium may include read-only memory (ROM), random-access memory (RAM), magnetic disk storage media, optical storage media, flash-memory devices, and similar storage media and excludes transitory signals.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A portable user device, comprising:
   a wireless transceiver; and
   a display device, wherein the portable user device is configured to
   send a request, via the wireless transceiver, to a server to transfer a communication session between a first user communication device and a second user communication device in response to receiving an indication of the communication session, such that the communication session is handed off from the first user communication device to the portable user device and
   receive automatic notification of communication sessions eligible for transfer from the first user communication device; and
   wherein the wireless transceiver is configured to establish a communication connection between the portable user device and the second user communication device in response to receiving, via the wireless transceiver, an agreement to the request such that the communication session between the first user communication device and the second user communication device is terminated after establishing the communication connection between the portable user device and the second user communication device, and the first user communication device and the portable user device share an identical telephone number.

2. The portable user device of claim 1, wherein the wireless transceiver is configured to register, at a server, an availability of the portable user device in response to the portable user device being available for the communication session.

3. The portable user device of claim 1, wherein the display device is configured to display information for the communication session.

4. The portable user device of claim 2, wherein the display device is configured to detect user input.

5. The portable user device of claim 2, wherein the display device is configured to remove displayed information for the communication session from the display device of after the communication connection between the portable user device and the second user communication device is established.

6. The portable user device of claim 1, wherein the wireless transceiver is configured to receive an OK message from the server in response to the request and send an acknowledge message to the server in response to the received OK message.

7. The portable user device of claim 1, wherein the portable user device and the first user communication device are in a subscription group configured to receive the automatic notification of eligible calls from an application server.

8. An application server comprising:
a network interface;
a memory device;
a processor in communication with the network interface and the memory device, the processor being configured to
facilitate establishment of communications sessions between multiple devices in response to receiving requests for establishment of such communications sessions,
receive automatic notification of communication sessions eligible for transfer from the first user communication device, and, subsequent to establishment of a communication session,
transfer the established communication session to a third device in response to receiving a request to connect the third device to the established communications session,
identify a first device and a second device currently participating in the established communications session,
determine that the third device is associated with the second device in connection with at least one group of end user,
select the first device to receive a reinvitation request based on the determination that the second device and the third device are associated with each other,
transmit the reinvitation request to the first device, wherein the reinvitation request indicates an IP address to which the first device is to begin transmitting session data for receipt by the third device, and
terminate the established communication session between the first device and the second device after establishing a new connection between the third device and the first device, and the second device and the third device share an identical telephone number.

9. The application server of claim 8, wherein, in facilitating connection of the third device to the communications session, the processor is further configured to send a session termination message to the second device.

10. The application server of claim 8, wherein the processor is configured to facilitate connection of the third device to the communications session in response to receiving the request to connect the third device to the existing communication session from the third device.

11. The application server of claim 10, wherein the request to connect the third device to an existing communication session is an invitation message that carries a public user ID (PUID) of the third device as a target of the invitation message, and, in facilitating connection of the third device to the communications session, the processor is further configured to determine, based on the invitation message carrying the PUID of the third device, that the invitation message is a request to be connected to an existing session instead of a request to establish a new session.

12. The application server of claim 8, wherein, in facilitating establishment of communications sessions between multiple devices, the processor is configured to, in response to establishment of the communication session, transmit an identifier to at least one additional device that has previously subscribed to notifications regarding one of the multiple devices.

13. The application server of claim 8, wherein, in facilitating connection of the third device to the communications session, the processor is further configured to establish a new conference call session, wherein the IP address is an IP address of a device providing the new conference call session.

14. The application server of claim 8, wherein the application server is configured to send the automatic notification of eligible calls to devices in a subscription group.

* * * * *